(12) United States Patent
Boeke et al.

(10) Patent No.: US 10,024,172 B2
(45) Date of Patent: Jul. 17, 2018

(54) GAS TURBINE ENGINE AIRFOIL

(71) Applicant: United Technologies Corporation, Hartford, CT (US)

(72) Inventors: Mark A. Boeke, Plainville, CT (US); Richard M. Salzillo, Plantsville, CT (US); Jeffrey J. DeGray, Hampden, MA (US); Shawn J. Gregg, Wethersfiled, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 332 days.

(21) Appl. No.: 14/634,006

(22) Filed: Feb. 27, 2015

(65) Prior Publication Data

US 2016/0251969 A1 Sep. 1, 2016

(51) Int. Cl.
| | |
|---|---|
| F04D 29/16 | (2006.01) |
| F04D 29/063 | (2006.01) |
| F01D 5/18 | (2006.01) |
| F01D 5/14 | (2006.01) |
| F01D 9/04 | (2006.01) |
| F01D 25/12 | (2006.01) |
| F01D 9/06 | (2006.01) |

(52) U.S. Cl.
CPC ............ *F01D 5/189* (2013.01); *F01D 5/141* (2013.01); *F01D 5/147* (2013.01); *F01D 9/041* (2013.01); *F01D 9/065* (2013.01); *F01D 25/12* (2013.01); *F05D 2220/32* (2013.01); *F05D 2230/20* (2013.01); *F05D 2230/60* (2013.01); *F05D 2240/126* (2013.01); *F05D 2240/301* (2013.01); *F05D 2240/81* (2013.01); *F05D 2260/221* (2013.01); *Y02T 50/676* (2013.01)

(58) Field of Classification Search
CPC .......... F01D 5/189; F01D 5/147; F01D 9/041; F01D 9/065; F01D 25/12; F01D 5/041; F01D 5/047
USPC ......................................................... 415/116
See application file for complete search history.

(56) References Cited

U.S. PATENT DOCUMENTS

| | | | | |
|---|---|---|---|---|
| 3,314,650 | A | * | 4/1967 | McCormick ............ F01D 5/181 415/114 |
| 3,540,810 | A | * | 11/1970 | Kercher ................... F01D 5/189 415/115 |
| 3,767,322 | A | | 10/1973 | Durgin et al. |
| 3,806,276 | A | | 4/1974 | Aspinwall |
| 5,209,644 | A | * | 5/1993 | Dorman ................... F01D 5/145 415/914 |

(Continued)

FOREIGN PATENT DOCUMENTS

| | | |
|---|---|---|
| EP | 1908921 | 4/2008 |
| EP | 2221453 | 8/2010 |

OTHER PUBLICATIONS

Extended European Search Report for European Application No. 16157737.4 dated Jul. 28, 2016.

*Primary Examiner* — Jason Shanske
*Assistant Examiner* — Jesse Prager
(74) *Attorney, Agent, or Firm* — Carlson, Gaskey & Olds, P.C.

(57) ABSTRACT

An airfoil includes an airfoil wall including an exterior airfoil surface and at least partially defines an airfoil cavity. A fillet is on the exterior airfoil surface. A recess is in an interior surface of the airfoil wall adjacent the fillet. A baffle tube is located in the airfoil cavity spaced from the recess.

18 Claims, 3 Drawing Sheets

(56) References Cited

U.S. PATENT DOCUMENTS

| | | | |
|---|---|---|---|
| 5,253,976 | A | 10/1993 | Cunha |
| 5,591,002 | A | 1/1997 | Cunha et al. |
| 5,630,700 | A * | 5/1997 | Olsen ................ F01D 5/189 |
| | | | 415/134 |
| 5,634,766 | A | 6/1997 | Cunha et al. |
| 5,743,708 | A | 4/1998 | Cunha et al. |
| 6,019,572 | A | 2/2000 | Cunha |
| 6,416,275 | B1 | 7/2002 | Itzel et al. |
| 6,453,557 | B1 * | 9/2002 | Burdgick ............ F01D 5/189 |
| | | | 29/889.7 |
| 6,517,312 | B1 | 2/2003 | Jones et al. |
| 7,008,185 | B2 | 3/2006 | Peterman et al. |
| 7,527,470 | B2 | 5/2009 | Guimbard et al. |
| 7,658,591 | B2 | 2/2010 | Dervaux et al. |
| 2004/0076520 | A1 | 4/2004 | Dellmann et al. |
| 2005/0058546 | A1 | 3/2005 | Cooper |
| 2013/0025123 | A1 | 1/2013 | Vetere et al. |
| 2013/0052008 | A1 | 2/2013 | Spangler |

* cited by examiner

GAS TURBINE ENGINE AIRFOIL

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The turbine section includes arrays of turbine vanes, such as first stage vanes in the gas turbine engine. The turbine blades in the turbine section experience high external heat loads that require high levels of cooling. Typically, numerous film cooling holes and high volumes of cooling fluid are required to provide the needed airfoil cooling. One or more baffles are typically provided within an internal cavity of the airfoil. Cooling fluid is supplied to the baffle, which is spaced from the airfoil. Baffle cooling holes direct cooling fluid onto an internal surface of the airfoil. This cooling fluid then exits the airfoil through film cooling holes to provide a film on the airfoil exterior surface.

Typically compressor bleed air is used to provide the cooling fluid. The volume of cooling fluid used to cool engine components impacts the efficiency of the engine.

SUMMARY

In one exemplary embodiment, an airfoil includes an airfoil wall including an exterior airfoil surface and at least partially defines an airfoil cavity. A fillet is on the exterior airfoil surface. A recess is in an interior surface of the airfoil wall adjacent the fillet. A baffle tube is located in the airfoil cavity spaced from the recess.

In a further embodiment of any of the above, the baffle tube includes a generally constant outer dimension.

In a further embodiment of any of the above, the airfoil includes a vane inner platform that has an inner baffle opening and a vane outer platform that has an outer baffle opening.

In a further embodiment of any of the above, the outer dimension of the baffle tube is smaller than an inner dimension of at least one of the inner baffle opening and the outer baffle opening.

In a further embodiment of any of the above, there is a ledge between the recess and at least one of the inner baffle opening and the outer baffle opening.

In a further embodiment of any of the above, the airfoil wall includes a first thickness in a mid-portion and a second thickness at the fillet that is approximately equal to the first thickness.

In a further embodiment of any of the above, the first thickness is within 10% to 20% of the second thickness.

In a further embodiment of any of the above, a first distance between the baffle tube and the interior surface on a mid-portion of the airfoil is less than a second distance between the baffle tube and the recess.

In a further embodiment of any of the above, the baffle is a single piece of material.

In another exemplary embodiment, a component for a gas turbine engine includes an airfoil that includes an exterior airfoil surface and at least partially defines an airfoil cavity. A fillet is on the exterior airfoil surface. An inner platform has an inner baffle opening. An interior surface of the airfoil includes a dimension that is larger than the inner baffle opening.

In a further embodiment of any of the above, a recess is in an interior surface of the airfoil wall adjacent the fillet.

In a further embodiment of any of the above, the airfoil includes an outer platform that has an outer baffle opening.

In a further embodiment of any of the above, a baffle tube is located in the airfoil cavity and has a generally constant outer dimension.

In a further embodiment of any of the above, the outer dimension of the baffle tube is smaller than an inner dimension of at least one of the inner baffle opening and the outer baffle opening.

In a further embodiment of any of the above, a first distance between the baffle tube and the interior surface on a mid-portion of the airfoil is less than a second distance between the baffle tube and the recess.

In another exemplary embodiment, a method of forming an airfoil includes forming a cavity within an airfoil wall. A fillet region is formed on an exterior of the airfoil wall and a recess on an interior surface of the airfoil wall adjacent the fillet region. A baffle tube is located within the cavity and spaced from the recess.

In a further embodiment of any of the above, the baffle tube includes a substantially constant outer dimension.

In a further embodiment of any of the above, an inner baffle opening is formed in an inner platform and a second baffle opening in an outer platform. The inner baffle opening and the outer baffle opening each include an inner dimension that is larger than the outer dimension of the baffle tube.

In a further embodiment of any of the above, a baffle is inserted into the first baffle opening.

In a further embodiment of any of the above, the baffle is a single piece of material.

The various features and advantages of this disclosure will become apparent to those skilled in the art from the following detailed description. The drawings that accompany the detailed description can be briefly described as follows.

DETAILED DESCRIPTION

Figure 1:
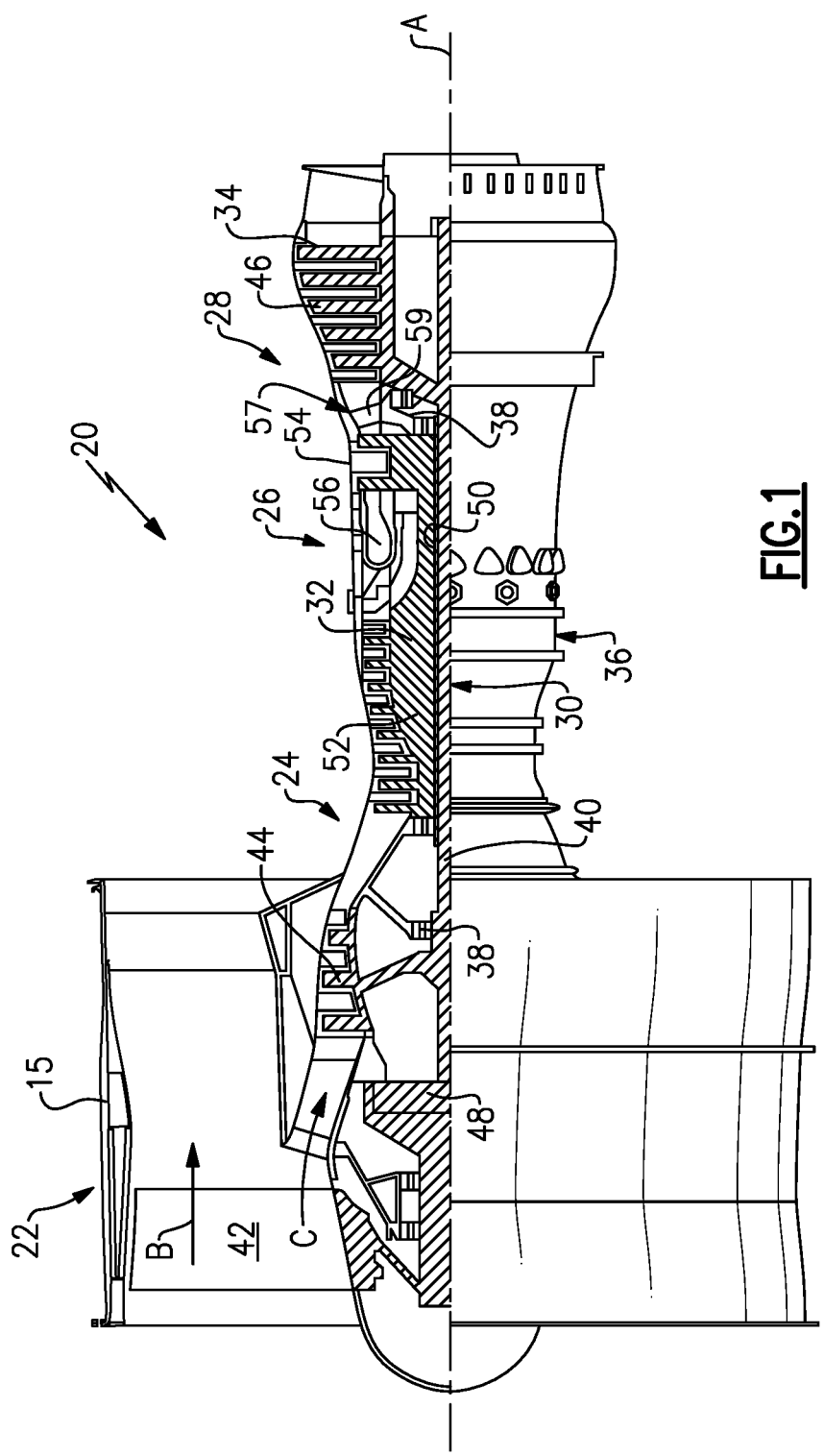
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
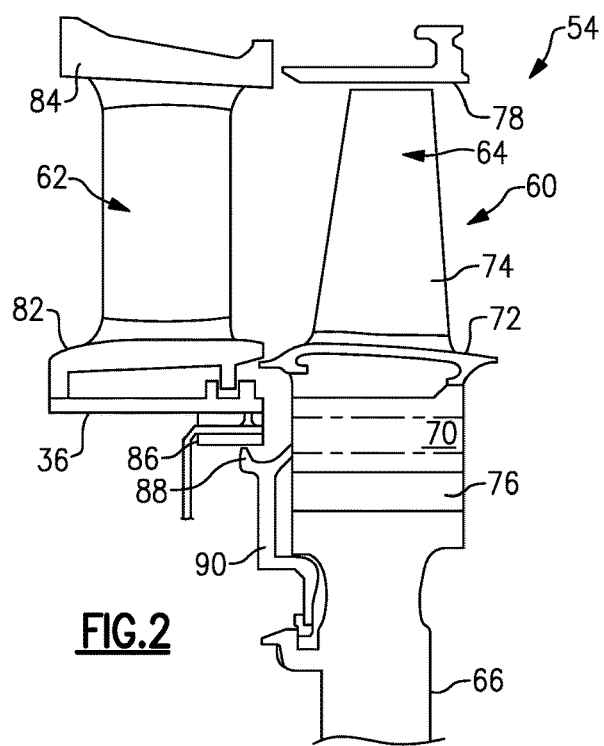
FIG. 2 illustrates an example turbine section of the gas turbine engine of FIG. 1.

FIG. 2 illustrates an enlarged schematic view of the high pressure turbine 54, however, other sections of the gas turbine engine 20 could benefit from this disclosure, such as the compressor section 24 or any other airfoil located in the gas turbine engine 20. The high pressure turbine 54 generally includes a one-stage turbine section. However, this disclose also applies to a two-stage turbine section. A rotor assembly 60 is attached to and rotates with the outer shaft 50 (FIG. 1).

The rotor assembly 60 includes an array of rotor blades 64 circumferentially spaced around a disk 66. Each of the array of rotor blades 64 includes a respective root portion 70, a platform 72, and an airfoil 74. Each of the root portions 70 is received within a respective rim 76 of the disk 66. The airfoil 74 extends radially outward toward a blade outer air seal (BOAS) assembly 78 from the platform 72 to a free end.

The array of rotor blades 64 is disposed in a core airflow path. The core airflow path was pressurized in the compressor section 24 then heated in the combustor section 26. The platform 72 separates a hot gas core airflow path side inclusive of the array of rotor blades 64 and a non-gas core airflow path side inclusive of the root portion 70.

An array of vanes 62 is located upstream of the array of rotor blades 64. Each vane 62 of the array of vanes 62 include an airfoil 68 extending between a respective vane inner platform 82 and a vane outer platform 84 to direct the hot gas core airflow path past the array of vanes 62. The array of vanes 62 may be supported by the engine static structure 36.

As shown in FIG. 2, an abradable annular seal 86, such as a honeycomb seal, prevents the hot gas airflow path from traveling radially inward. The abradable annular seal 86 is located adjacent a first knife edge seal 88 that extends from a first disk plate 90. Alternatively, a tangential onboard injector could be located in place of the abradable annular seal 86 when the array of vanes 62 are adjacent a first stage of the high pressure turbine section 54.

Figure 3:
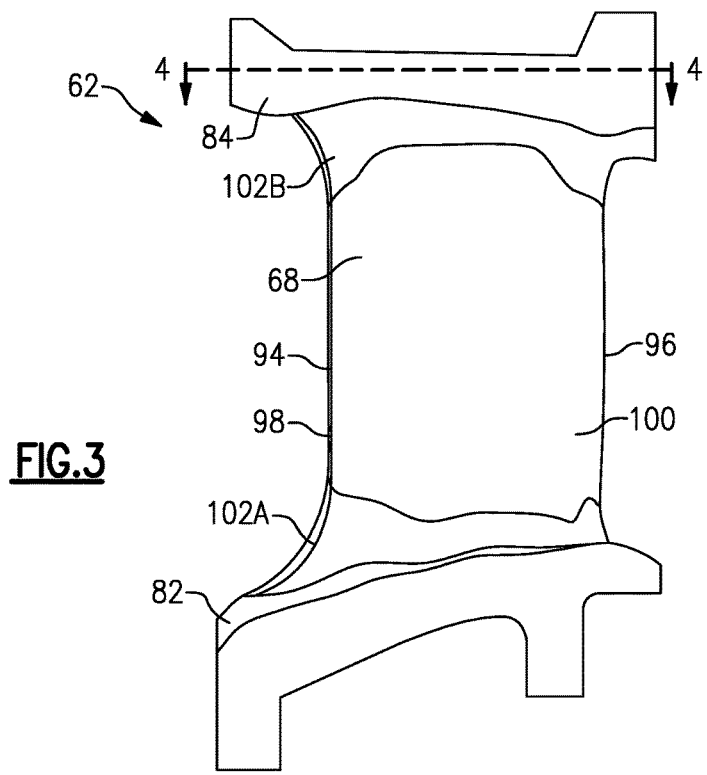
FIG. 3 illustrates an example vane.

FIG. 3 illustrates the vane 62 having a leading edge 94, a trailing edge 96, a pressure side 98, and a suction side 100. A radially inner fillet 102A transitions between the airfoil 68 and the vane inner platform 82 and a radially outer fillet 102B transitions between the airfoil 68 and the vane outer platform 84.

Figure 4:
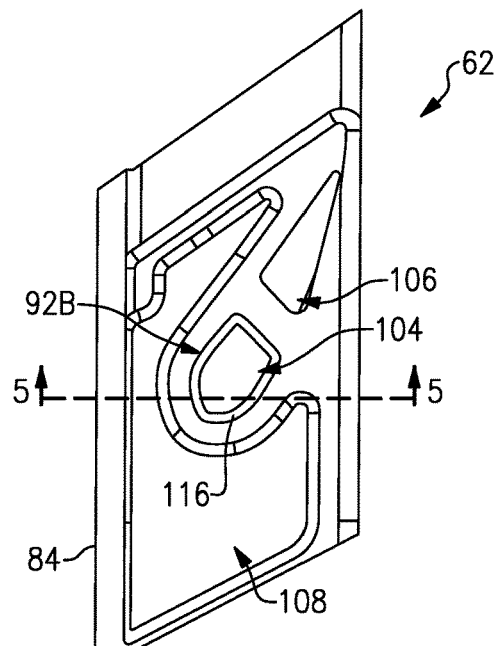
FIG. 4 is a section view taken along line 4-4 of FIG. 3.
Figure 5:
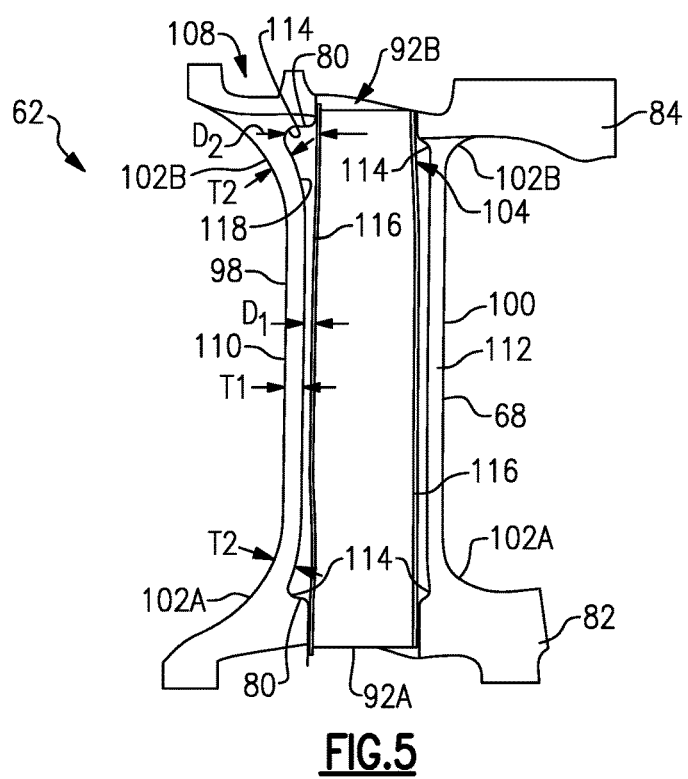
FIG. 5 is a section view taken along line 5-5 of FIG. 4.

As shown in FIGS. 4 and 5, the vane 62 includes a leading edge cavity 104 having an inner baffle opening 92A in the vane inner platform 82 and an outer baffle opening 92B in the vane outer platform 84. A trailing edge cavity 106 is located downstream of the leading edge cavity 104. In another example, the vane 62 could include an intermediate cavity located axially between the leading edge cavity 104 and the trailing edge cavity 106. The vane outer platform 84 includes a platform cooling passage 108 for cooling the vane outer platform 84.

The vane 62 includes a pressure side wall 110 and a suction side wall 112. A curvature of the radially inner and outer fillets 102A, 102B is greater along the pressure side wall 110 than the suction side wall 112. In the illustrated example, a first thickness T1 in a mid-portion of the pressure side wall 110 is substantially equal to a second thickness T2 of the pressure side wall 110 at the radially inner and outer fillets 102A, 102B. In another example, the first thickness T1 and the second thickness T2 are within 10% to 20% of being equal.

A recess 114 surround a radially inner and outer perimeter of the airfoil 68 adjacent the vane inner and outer platforms 82, 84 and forms a ledge 80 between the recess 114 and the inner and outer baffle openings 92A, 92B. The recess 114 reduces a thickness of the airfoil 68 in a region of both the radially inner and outer fillets 102A, 102B. By reducing the thickness of the airfoil 68 in the region of both the radially inner and outer fillets 102A, 102B, heat accumulation in the radially inner and outer fillets 102A, 102B is reduced.

A size of the recess 114 can vary around the perimeter of the airfoil 68. In the illustrated example, the recess 114 is larger along the pressure side wall 110 than on the suction side wall 112. The recess 114 varies in size between the pressure side wall 110 and the suction side wall 112 due to the larger radii of the radially inner and outer fillets 102A, 102B along the pressure side wall 110 than along the suction side wall 112 of the airfoil 68.

FIG. 5 illustrates a baffle tube 116 located in the leading edge cavity 104. The baffle tube 116 includes an outer dimension that is smaller than an inner dimension of the inner baffle opening 92A and the outer baffle opening 92B. The outer dimension of the baffle tube 116 is relative to an axis of the baffle tube 116 which extends in a radial direction and the inner dimension of the inner and outer baffle openings 92A, 92B is relative to an axis that also extends in a radial direction. When the baffle tube 116 is installed into the vane 62, a portion of the baffle tube 116 remains in the inner baffle opening 92A and the outer baffle opening 92B.

The outer dimension of the baffle tube 116 is generally constant along the length of the baffle tube and does not follow a contour of an interior surface of the leading edge cavity 104. Because the inner dimensions of the inner and outer baffle openings 92A and 92B are larger than the outer dimension of the baffle tube 116, the baffle tube 116 can be inserted through either of the inner and outer baffle openings 92A, 92B. Since the baffle tube 116 can be inserted through either of the inner and outer baffle openings 92A, 92B, the baffle tube 116 can be made of a single piece of material, which reduces the number of components in the vane 62 compared to multiple piece baffle tubes. In another example, a stop, such as a protrusion, would extend into one of the inner baffle opening 92A and the outer baffle opening 92B to aid in locating the baffle tube 116 in the leading edge cavity 104. Additionally, the baffle tube 116 could include a taper from a feed end towards a distal end.

Because the outer dimension of the baffle tube 116 does not extend beyond an inner dimension of the inner and outer baffle openings 92A, 92B, a spacing between the baffle tube 116 and the inner wall 118 of the leading edge cavity 104 varies. In the illustrated example, the outer surface of the baffle tube 116 is spaced a distance D1 from the inner surface 118 of a mid-portion of the leading edge cavity 104 and a distance D2 between the baffle tube 116 and the recess 114. The distance D2 is larger than the distance D1. In one example, the distance D2 is twice as large as the distance D1 and in another example, the distance D2 is at least three times as large as the distance D1.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
a vane inner platform having a first baffle opening and a vane outer platform having a second baffle opening;
an airfoil wall including an exterior airfoil surface and at least partially defining an airfoil cavity, wherein the airfoil wall is rigidly fixed from movement relative to at least one of the vane inner platform and the vane outer platform;
a first fillet surrounding the exterior airfoil surface adjacent the inner vane platform;
a first recess surrounding a radially inner perimeter of an interior surface of the airfoil wall adjacent the first fillet;
a first ledge between the first recess and the first baffle opening;
a second fillet surrounding the exterior airfoil surface adjacent the outer vane platform;
a second recess surrounding a radially outer perimeter of the interior surface of the airfoil wall adjacent the second fillet;
a second ledge between the second recess and the second baffle opening; and
a baffle tube located in the airfoil cavity spaced from the first recess.

2. The airfoil of claim 1, wherein the baffle tube includes a constant outer dimension.

3. The airfoil of claim 1, wherein the outer dimension of the baffle tube is smaller than an inner dimension of at least one of the first baffle opening and the second baffle opening.

4. The airfoil of claim 1, wherein the first ledge extends towards the baffle tube to define the first baffle opening and the first baffle opening includes a dimension across the first baffle opening smaller than a dimension defined by the first recess.

5. The airfoil of claim 1, wherein the airfoil wall includes a first thickness in a mid-portion and a second thickness at the first fillet that is equal to the first thickness.

6. The airfoil of claim 1, wherein the airfoil wall includes a first thickness in a mid-portion and a second thickness at the first fillet, wherein the first thickness is within 10% to 20% of the second thickness.

7. The airfoil of claim 1, wherein a first distance between the baffle tube and the interior surface on a mid-portion of the airfoil is less than a second distance between the baffle tube and the first recess.

8. The airfoil of claim 1, wherein the baffle tube is a single piece of material.

9. A component for a gas turbine engine comprising:
an airfoil including:
   a vane inner platform having a first baffle opening and a vane outer platform having a second baffle opening;
   an airfoil wall having an exterior airfoil surface and at least partially defining an airfoil cavity extending between the vane inner platform and the vane outer platform, wherein the airfoil wall is a unitary structure with at least one of the inner vane platform and the outer vane platform;
   a first fillet surrounding the exterior airfoil surface adjacent the inner vane platform;
   a first recess surrounding a radially inner perimeter of an interior surface of the airfoil wall adjacent the first fillet;
   a second fillet surrounding the exterior airfoil surface adjacent the outer vane platform;
   a second recess surrounding a radially outer perimeter of the interior surface of the airfoil wall adjacent the second fillet;
   a first ledge between the first recess and the first baffle opening and a second ledge between the second recess and the second baffle opening; and
   wherein an interior surface of the airfoil includes a dimension that is larger than the first baffle opening.

10. The component of claim 9, further comprising a baffle tube located in the airfoil cavity having a constant outer dimension.

11. The component of claim 10, wherein the outer dimension of the baffle tube is smaller than an inner dimension of at least one of the first baffle opening and the second baffle opening.

12. The component of claim 10, wherein a first distance between the baffle tube and the interior surface on a mid-portion of the airfoil is less than a second distance between the baffle tube and the first recess.

13. A method of forming an airfoil comprising:
forming a cavity within an airfoil wall;
forming a first fillet surrounding an exterior of the airfoil wall adjacent an inner platform and a first recess surrounding a radially inner perimeter of on an interior surface of the airfoil wall adjacent the first fillet region;
forming a second fillet surrounding the exterior airfoil surface adjacent an outer vane platform and a second recess surrounding a radially outer perimeter of the interior surface of the airfoil wall adjacent the second fillet and a first ledge between the first recess and a first baffle opening and a second ledge between the second recess and a second baffle opening; and
locating a baffle tube within the cavity and spaced from the first recess and the second recess.

14. The method of claim 13, wherein the baffle tube includes a substantially constant outer dimension and is made of a single piece of material.

15. The method of claim 13, further comprising forming the first baffle opening in an inner platform and the second baffle opening in an outer platform, wherein the first baffle opening and the second baffle opening each include an inner dimension that is larger than the outer dimension of the baffle tube.

16. The method of claim 15, further comprising inserting the baffle tube through the first baffle opening.

17. The component of claim 9, wherein the first ledge extends towards a baffle tube to define the first baffle opening, the first baffle tube opening includes a dimension across the first baffle tube opening smaller than a dimension defined by the first recess.

18. The method of claim 13, wherein the first ledge extends towards the baffle tube to define the first baffle opening, the first baffle opening includes a dimension across the first baffle opening smaller than a dimension defined by the first recess.

* * * * *